Jan. 17, 1961 A. J. CHAPIN 2,968,376
JOINT LOCK FOR SHEET METAL PARTS
Filed Dec. 19, 1958
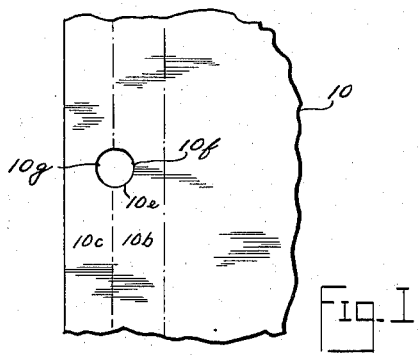
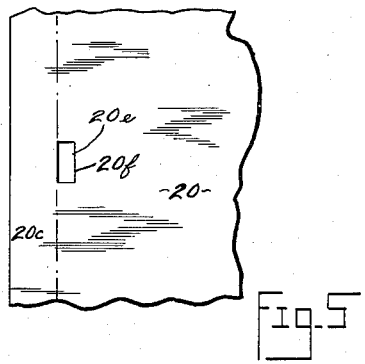
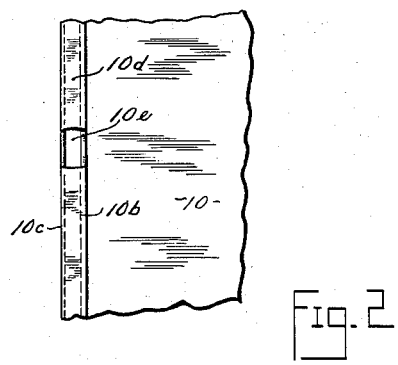
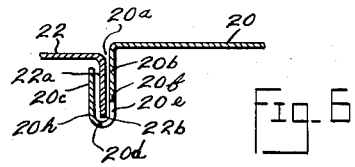
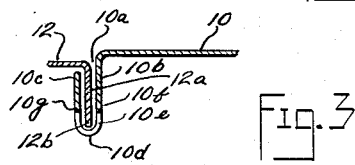
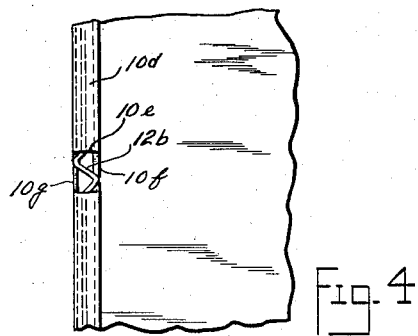
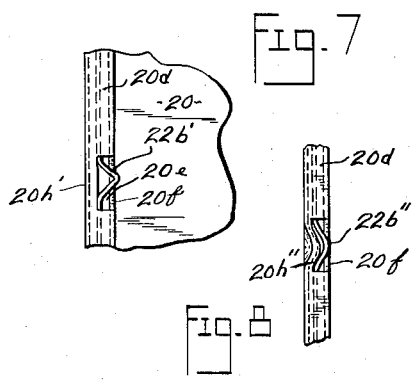
INVENTOR.
ALMON J. CHAPIN
BY
*Hyde, Meyer, Baldwin & Doran*
ATTORNEYS

United States Patent Office 2,968,376
Patented Jan. 17, 1961

2,968,376

JOINT LOCK FOR SHEET METAL PARTS

Almon J. Chapin, Oberlin, Ohio, assignor to The Johnson Furnace Company, Cleveland, Ohio, a corporation of Ohio Filed Dec. 19, 1958, Ser. No. 781,615

3 Claims. (Cl. 189—36)

This invention relates to improvements in a joint lock and more particularly to a joint lock for sheet metal parts.

One of the objects of the present invention is to provide a joint lock or fastening construction for two members with one of the members having a U-shape channel with an opening through said member contiguous to the bend of this U-shape, and the other of said members extending into this channel with the portion aligned with the above-mentioned opening being deformed laterally to lock the members together.

A further object of the present invention is to provide a method of fastening two members together with this type joint lock or fastening means.

A further object of the present invention is to provide a joint lock or fastening means, especially adapted for sheet metal parts, characterized by its inexpensive manufacturing cost, structural simplicity, simplicity of manufacture, ease of assembly of its component parts, and/or strong and sturdy nature.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 1 is a plan view of a first form sheet metal blank part before bending a portion thereof into a U-shape channel;

Fig. 2 is a plan view of the blank in Fig. 1 after bending a portion into a U-shape channel;

Fig. 3 is a transverse sectional view through two assembled members, including the member in Fig. 2, prior to deforming a portion of one of the members to lock them together;

Fig. 4 is a bottom plan view of the structure in Fig. 3 with the portion of one of the members laterally deformed into locking engagement;

Fig. 5 is a plan view of a second form of sheet metal blank prior to bending a portion thereof into a U-shape channel;

Fig. 6 is a transverse sectional view of assembled members prior to deforming a portion of one of the members into locking engagement and with one of the members being the blank in Fig. 5 having a portion bent into a U-shape channel;

Fig. 7 is a bottom plan view of the construction shown in Fig. 6 with a portion of the inner member laterally deformed into locking engagement to provide one locking construction; while Fig. 8 is a bottom plan view of the construction in Fig. 6 with a portion of both members laterally deformed into locking engagement to provide another locking construction.

Before the structure here illustrated is specifically described, it is to be understood that the invention here involved is not limited to the structural details or arrangement of parts here shown and is not limited to the method steps here described since the structural details or method embodying the present invention may take various forms. It also is to be understood that the phraseology or terminology herein employed is for purposes of description and not of limitation since the scope of the present invention is denoted by the appended claims.

While the present invention might be adapted to various uses, it has been chosen to show the same for fastening or joining two sheet metal parts or members.

When manufacturing sheet metal parts, such as air ducts and furnace casings, it is desirable to securely join or fasten together the sheet metal component parts or members. The drawings disclose several joint structures and methods for performing this operation. Figs. 1–4 illustrate a progressive formation of a joint lock for sheet metal members 10 and 12. Figs. 5 and 6 illustrate progressive formation of a joint lock of sheet metal members 20 and 22 with these members locked in final position by the construction shown in either Fig. 7 or 8.

In each form of the invention, one of the members 10 or 20 has been bent or otherwise formed on one end thereof a U-shape channel 10a or 20a in Figs. 3 and 6 respectively with an opening 10e or 20e through this member contiguous to the bend 10d or 20d formed by the U-shape.

These openings 10e and 20e may be of any suitable shape and located in any suitable location contiguous to bends 10d and 20d respectively. In Figs. 1 and 3, circular opening 10e has portions straddling the bend 10d and located in both legs 10b and 10c of the U-shape 10a. In Fig. 6, rectangular opening 20e is located wholly on one side of bend 10d and is located in only one leg 20b of the legs 20b and 20c forming the U-shape channel 20a.

In all disclosed forms of the invention, the other members 12 and 22 have sheet elements 12a and 22a respectively in Figs. 3 and 6 inserted into and extending into U-shape channels 10a and 20a respectively, with portions 12b and 22b inserted into the bend 10d and 20d of this U-shape channel and laterally aligned with openings 10e and 20e. Hence, members 10 and 20 are assembled with members 12 and 22 as coacting female and male members. At least portions 12b in Fig. 4 and 22b in Fig. 6 (shown as portion 22b' in Fig. 7 or portion 22b" in Fig. 8) are deformed laterally into locking engagement with members 10 and 20 to lock the members together.

This locking action differs in Figs. 4, 7 and 8. In Fig. 4, a workman may engage portion 12b with a pliers and twist it laterally into deformed alignment with opposite edges 10f and 10g in legs 10b and 10c of member 10 and which form the U-shape channel so as to prevent pull out of member 12 from this channel 10a. In Figs. 7 and 8, portion 22b is twisted into portion 22b' in Fig. 7 or portion 22b" in Fig. 8 located laterally in alignment with edge 20f of opening 20e in only one of the legs 20b forming the U-shape channel 20a to prevent pull out of member 22 from this channel 20a. In Fig. 7, an instrument, such as a screwdriver blade may be inserted between portions 20h and 22b in Fig. 6 laterally aligned with opening 20e, and then when the screwdriver blade is twisted, portion 22b is bent laterally away from portion 20h until these portions assume the positions shown by corresponding portions 22b' and 22h" in Fig. 7. As to Fig. 8, if both portions 22b and 20h in Fig. 6 are gripped by a pliers and twisted, both of these portions may be bent laterally in the direction of opening 20e to assume the position shown by portions 20h" and 22b" to lock the members together.

Various changes in details and arrangement of parts can be made by one skilled in the art without departing from either the spirit of this invention or the scope of the appended claims.

What is claimed is:

1. A fastening construction for two members, comprising one of said members having a U-shaped channel with an opening through said one member contiguous to the bend formed by said U-shape, the other of said members having a generally planar sheet element extending into said channel with a portion of said element aligned with said opening, said opening being generally in line with the plane of said sheet extended, and said portion being twisted laterally into alignment with opposite edges of said opening in both legs of said U-shape to prevent pull out of said other member from said channel.

2. A fastening construction for two members, comprising one of said members having a U-shaped channel with an opening through said one member contiguous to the bend formed by said U-shape, the other of said members having a generally planar sheet element extending into said channel with a portion of said element aligned with said opening, said opening being generally in line with the plane of said sheet extended, said portion being deformed laterally to lock said members together, and said opening having portions straddling said bend and located in both legs of said U-shape.

3. A fastening construction for two members, comprising one of said members having a U-shaped channel with two generally parallel legs and with an opening through said one member contiguous to the bend formed by said U-shape, the other of said members having a generally planar sheet element extending into said channel with a portion of said element aligned with said opening, said opening being generally in line with the plane of said sheet extended, and said portion being twisted laterally out of the plane of said sheet into alignment with at least one leg of said U-shape to prevent pull out of said other member from said channel.

References Cited in the file of this patent

UNITED STATES PATENTS

| 1,827,722 | Hayman | Oct. 13, 1931 |
| 2,126,499 | Petersen | Aug. 9, 1938 |
| 2,164,634 | Barrett | July 4, 1939 |
| 2,249,257 | Rummey et al. | July 15, 1941 |
| 2,266,593 | Emmons | Dec. 16, 1941 |
| 2,611,460 | Nash | Sept. 23, 1952 |
| 2,815,568 | Bianca et al. | Dec. 10, 1957 |

FOREIGN PATENTS

| 682,776 | Great Britain | Nov. 19, 1952 |